United States Patent [19]

Fukawa

[11] 4,178,616

[45] Dec. 11, 1979

[54] CASSETTE TAPE RECORDER

[75] Inventor: Kazumi Fukawa, Asaka, Japan

[73] Assignee: Copal Company Limited, Tokyo, Japan

[21] Appl. No.: 906,212

[22] Filed: May 15, 1978

[30] Foreign Application Priority Data

Jul. 29, 1977 [JP] Japan .................... 52-091089

[51] Int. Cl.² .................... G11B 15/48; G11B 15/18
[52] U.S. Cl. .................... 360/74.1; 360/71
[58] Field of Search .................... 360/74, 73, 71; 226/122, 49, 43

[56] References Cited

U.S. PATENT DOCUMENTS

| 3,965,483 | 6/1976 | Katoh et al. | 360/74 |
| 4,031,556 | 6/1977 | Ban et al. | 360/74 |
| 4,124,873 | 11/1978 | Satoh et al. | 360/74 |

Primary Examiner—Vincent P. Canney
Attorney, Agent, or Firm—J. Harold Nissen

[57] ABSTRACT

A cassette tape recorder capable of manually switching the operation thereof to any one of a stop, a reproducing, a quick winding or a quick rewinding position.

A swingable switching lever is coupled with an actuating lever, and a frictional driving wheel integral with a driving shaft mounted on the free end of the actuating lever. An idler friction wheel is located at a position opposite to a frictionally driven wheel with respect to the driving shaft. Either the driving shaft or the frictional driving wheel is held disengaged from the frictionally driven wheel or the idler friction wheel when the actuating lever is at the stop position. When the actuating lever is switched to the reproducing position, the switching lever urges the driving shaft to compressively contact with the frictionally driven wheel. When the actuating lever is switched to the quick rewinding position, the switching lever is swung in the opposite direction and urges the frictionally driving wheel to compressively contact with the idler friction wheel integral with the idler gear to drive the rewinding reel mounting shaft at a higher speed.

8 Claims, 8 Drawing Figures

Fig. 3
Fig. 4
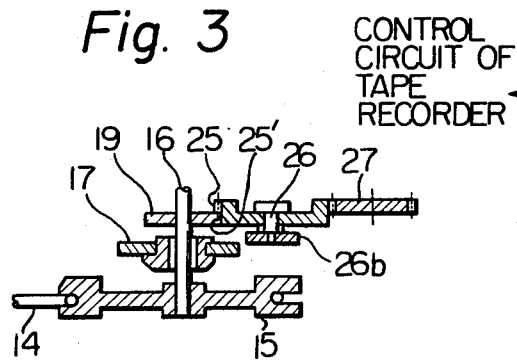
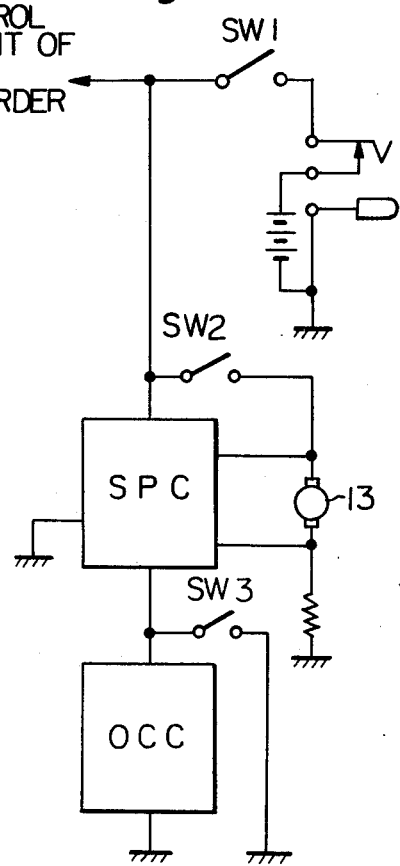
Fig. 5
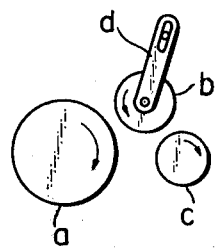
Fig. 6    Fig. 7    Fig. 8
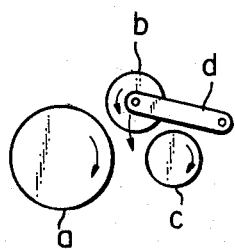 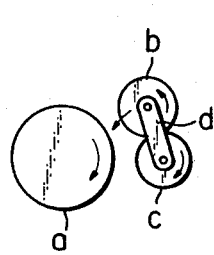 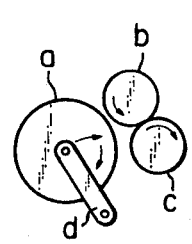

CASSETTE TAPE RECORDER

BACKGROUND OF THE INVENTION

The present invention relates to a cassette tape recorder of the type in which the tape in the cassette loaded in the tape is driven by the winding reel in the cassette so as to be wound up onto the winding reel for the reproducing or the quick winding operation while the tape is driven by the rewinding or supply reel in the cassette so as to be rewound onto the rewinding reel for the quick rewinding operation.

Heretofore, a prior art tape recorder has been provided with a mechanism for effecting the reversing of the operation of the motor for effecting the winding or the rewinding operation of the tape thereby rendering the construction to be complicated and the size of the tape recorder to be large while a plurality of operating knobs for effecting switching of the tape recorder for various modes of operation thereof thereby rendering the manipulation of the tape recorder to be complicated and very troublesome leading to an improper or false function of the tape recorder.

In a prior art cassette tape recorder such as a dictating machine, for example, which is adapted to be used by a supervisory person who has to give various orders or instructions to his followers by recording the instructions in the tape recorder, it is necessary for the supervisory person to record his instructions quickly in time while he is doing other jobs parallelly with the recording operation. Thus, it is highly desirable that the tape recorder is small in size and handy to carry, while the manipulation of the tape recorder is made easy and simple without causing any false functions which might be caused by hurried manipulation of the tape recorder. However, the prior art tape recorder of the type described above is relatively troublesome in manipulation because of the provision of a plurality of various manually operable knobs, thereby causing improper or false functions to occur so that the recording operation of the same content must be repeated in order to obtain the required instructions thereby wasting time and labor.

In a prior art cassette tape recorder of the type in which a switchable power transmitting device is provided and a fly wheel serving as a switching member is arranged in the power transmitting device which member is driven by a driving motor, the fly wheel is in general formed with a driving shaft and a driving gear integral therewith, the driving shaft being selectively engaged with a frictionally driven wheel integral with the winding reel mounting shaft when the switchable power transmitting device is switched to the reproducing position of the tape recorder so as to feed the tape for the reproducing operation, while, when the switchable power transmitting device is switched to the quick rewinding position, the driving gear integral with the fly wheel is brought to mesh with a driven gear operably coupled with the supply or rewinding reel mounting shaft and adapted to feed the tape in the reverse direction for the quick rewinding operation thereby effecting the quick rewinding operation.

In such a tape recorder, however, substantial noise is generated when the tape recorder is switched to the rewinding position due to the meshing engagement of the gears thereby deteriorating the smooth operation of the tape recorder, and, further, the gears might be damaged or the tape is broken when the feeding of the tape reaches the terminal position, because the great inertia of the rotating fly wheel is given to the meshing gears as an impact force.

Further, a large stroke of movement of the axis of the driving gear is required in order to insure its positive engagement with and disengagement from the driven gear thereby making it difficult to arrange the mechanism in a small space required to a handy cassette tape recorder suitable for a dictating machine described above.

It has also been proposed to utilize frictional wheels in place of the above described driving and driven gears. In such an arrangement, however, an idler friction wheel which must be held apart from either of a driving friction wheel and a driven friction wheel during the inoperative position of the tape recorder will have to engage with both the driving and the driven friction wheels in the most adequate angular relationship to each other as the driving friction wheel integral with the rotating fly wheel is moved for the rewinding operation. The construction and the relative arrangement of the parts for achieving the above function is, however, very complicated and difficult so as to be incorporated in a compact type tape recorder. Further, in a power transmitting device utilizing such friction wheels, the torque transmitted through the device tends to widely vary depending upon the variation in the ambient temperature, humidity and the like because the physical conditions such as hardness and the surface condition of rubber tires uded in the friction wheels vary as the ambient conditions vary.

The present invention aims at avoiding the above described disadvantages of the prior art tape recorder.

SUMMARY OF THE INVENTION

The object of the present invention is to provide a novel and useful tape recorder of the type described above which is small in size and handy to carry while it is simple in construction and easy to manipulate quickly without causing any false function.

The above object is achieved in accordance with the present invention by the provision of a tape recorder capable of manually switching the operation of thereof to and one of a stop, a reproducing, a quick winding or a quick rewinding position and having a manually operable actuating lever for switching the position of operation of the tape recorder, a swingable switching lever coupled with the actuating lever and mounting on the free end thereof a driving shaft and a driving wheel means integral therewith which are driven by a driving motor adapted to rotate in a predetermined direction, a winding reel mounting shaft having a frictionally driven wheel integral therewith and a supply or rewinding reel mounting shaft having a driven gear integral therewith which is coupled with an idler wheel means, the idler wheel means being located at a position opposite to the frictionally driven wheel with respect to the driving shaft integral with the driving wheel means, the driving shaft and the driving wheel means being held disengaged from the frictionally driven wheel or the idler wheel means at the stop position of the actuating lever, but, when the actuating lever is switched to the reproducing position, the switching lever is swung in one direction so as to compressively contact the driving shaft with the frictionally driven wheel thereby driving the winding reel mounting shaft at a predetermined speed for the reproducing operation, while, when the actuating lever is switched to the quick rewinding position, the switching lever is swung in the opposite direction so as to compressively contact the driving wheel means with the idler wheel means thereby driving the rewinding reel mounting shaft at a higher speed through the driven gear for the quick rewinding operation, the tape recorder being characterized in that the driving wheel means integral with the driving shaft comprises a frictional driving wheel and the idler wheel means is comprised of an idler friction wheel adapted to engage with the frictional driving wheel at the rewinding position of the actuating lever and of an idler gear integral with the idler friction wheel and meshing with the driven gear of the rewinding reel mounting shaft thereby permitting the rewinding reel mounting shaft to be frictionally driven through the idler friction wheel for the quick rewinding operation.

The tape recorder constructed as described above is very smooth in operation without causing any noise in switching the position of operation of the tape recorder which accurate operation is insured. Since the manipulation of the single actuating lever permits the switching of the tape recorder to any one of the stop, the reproducing, the quick winding or the quick rewinding position, the manipulation of the tape recorder is made very simple without causing any false function in hurried operation of the actuating lever.

According to the present invention, the tape recorder further comprises a first switch for energizing the tape recorder when the first switch is actuated, the first switch being so operably coupled with the actuating lever that the first switch is actuated only when the actuating lever is switched from the stop position thereof to any one of the reproducing, the quick winding or the quick rewinding position. This greatly saves the electric power of the tape recorder by merely manipulating the actuating lever for the operation of the tape recorder.

The tape recorder of the present invention further comprises a motor speed control circuit for driving the motor at a constant speed corresponding to the predetermined constant speed for the reproducing operation of the tape recorder when the motor speed control circuit is connected to the motor, and a second switch connected to the motor speed control circuit for short-circuiting the motor speed control circuit when the second switch is actuated. The second switch is so coupled with the actuating lever that the said second switch is actuated only when the actuating lever is switched to the quick winding position at which the switching lever is swung in the one direction so as to maintain the driving shaft in compressive contact with the frictionally driven wheel of the winding reel mounting shaft, thereby permitting the winding reel mounting shaft to be driven at a higher speed for the quick winding operation by virtue of short-circuiting of the motor speed control circuit. Thus, the switching of the tape recorder to the quick winding operation is made very simple by merely manipulating one and the same actuating lever.

The tape recorder of the present invention further comprises an overcurrent detecting and interrupting circuit connected to the motor speed control circuit for interrupting and preventing the overcurrent from flowing through the motor via the motor speed control circuit upon detection of the occurrence of the overcurrent to be flown through the motor by the overcurrent detecting and interrupting circuit at the reproducing position of the actuating lever, and a third switch connected to the overcurrent detecting and interrupting circuit for short-circuiting the same when actuated, the third switch being so operably coupled with the actuating lever that the third switch is actuated for short-circuiting the overcurrent detecting and interrupting circuit when the actuating lever is switched to either of the quick winding and the quick rewinding position, thereby insuring the motor to be driven even under overcurrent condition for a short period of time only when the actuating lever is at either of the quick winding and the quick rewinding position. Since the quick winding and the quick rewinding operation is required to be effected only a short period of time, the short-circuiting of the overcurrent detecting and interrupting circuit during the quick winding and the quick rewinding operation will not cause damages to the motor and positive operation of the tape recorder at those positions is insured, while the tape recorder will be positively stopped so as to prevent damages to the tape recorder when undue overcurrent commences to flow through the motor at the reproducing position of the tape recorder due to sticking or the termination of the tape or failure of some mechanical parts of the tape recorder.

Further, the tape recorder of the present invention comprises click means cooperating with cam means formed in the actuating lever so that the actuating lever is clickingly held at either of the stop and the reproducing position, the cam means being so configured with respect to the click means that the actuating lever is automatically switched from the quick winding or the quick rewinding position to the reproducing or the stop position when manual operation of the actuating lever to either of the quick winding or the quick rewinding position is released. This greatly facilitates the manipulation of the tape recorder.

For the recording operation, the tape recorder of the present invention comprises a manually operable recording lever for switching the tape recorder from the reproducing operation to the recording operation when the recording lever is actuated. An arresting lever is provided which is adapted to releasably arrest the recording lever at the operative position thereof when the recording lever is moved from its normal inoperative position to the operative position, the arresting lever being so operatively coupled with the actuating lever that the arresting lever is actuated so as to release the recording lever for returning it to its inoperative position from the operative position whenever the actuating lever is switched to either of the quick winding and the quick rewinding position. This positively avoids the false function in which the tape recorder be held in the recording position during the quick winding or the quick rewinding position. The eraser head is coupled with the recording lever so that the eraser head is brought to the operative position only when the recording lever is switched to the operative position. All such operations are effected by merely manipulating the actuating lever.

BRIEF DESCRIPTION OF THE DRAWINGS

FIG. 3 is a schematic view showing in developed state with a portion of the sectional view passing through the axes of the shafts 16, 26 in FIG. 2, while the other portion of the sectional view passes through the axis of the shaft 26 and the axis of the gear 27;

FIG. 4 is a schematic wiring diagram showing the electric circuit for controlling the operation of the motor incorporated in the cassette tape recorder of FIG. 1; and FIGS. 5 to 8 are views showing various types of general power transmitting mechanism.

DETAILED DESCRIPTION OF THE PREFERRED EMBODIMENT

Figure 1:
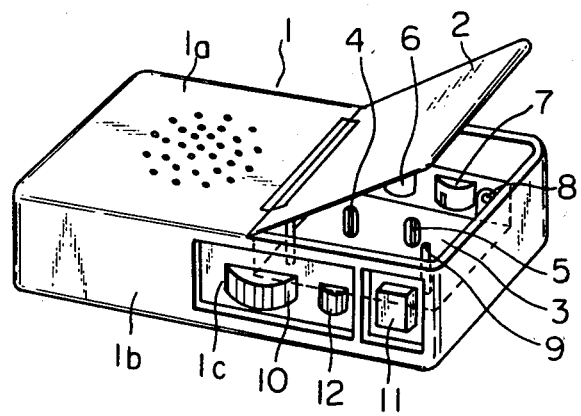
FIG. 1 is a general perspective view showing an embodiment of the cassette tape recorder of the present invention.

In FIG. 1, the body 1 of the tape recorder of the present invention has an upper wall 1a on which a cover plate 2 for loading the cassette (not shown) is swingably mounted. A recess 3 for locating the cassette therein is formed in the body 1 beneath the cover 2 and a winding reel mounting shaft 4 for receiving the wind-up reel of the cassette and a supply or rewinding reel mounting shaft 5 protrude into the recess 3 from the bottom wall of the recess 3 while a recording/reproducing head 6, an eraser head 7, cassette pressing springs 8 and cassette locating pins 9 are arranged in positions in the recess 3 as in the case of the conventional tape recorder.

Figure 2:
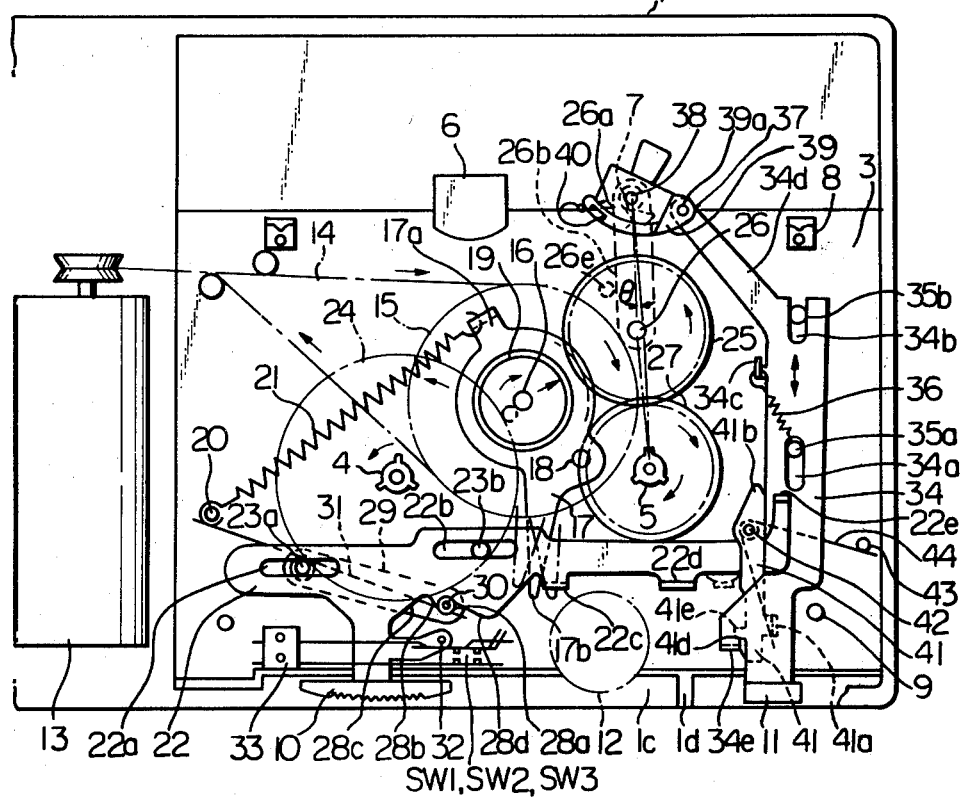
FIG. 2 is a schematic plan view showing the main internal construction of the cassette tape recorder shown in FIG. 1.

An operating knob 10 for manually switching the operation of the tape recorder to either of the stop, the reproducing, the quick winding and the quick rewinding position, a recording knob 11 for manually switching the operation of the tape recorder from the reproducing position to the recording position and a volume control knob 12 are arranged in the front wall 1b of the body 1. The tape recorder is operated in various modes by manipulating these knobs. As shown in FIG. 2, these knobs are located in a recessed portion 1c of the body 1 having a partition 1d, so that the knobs are prevented from being moved inadvertently so as to avoid the false function of the tape recorder.

In FIG. 2 showing the main portions of the internal mechanism of the tape recorder of the present invention, the driving motor 13 arranged in the body 1 is adapted to drive through a belt 14 a pulley 15 in the form of a fly wheel in the clockwise direction by an electric source (not shown). The pulley 15 is fixedly secured to a driving shaft 16 which is rotatably supported on a swingable switching lever 17 which is in turn swingably supported in the body 1 by a shaft 18 and is urged in the counterclockwise direction by a spring 21 having its one end secured to the bent lug 17a of the switching lever 17 and its other end secured to a pin 20 secured to the body 1. As shown in FIG. 2, a frictional driving wheel 19 is integrally mounted on the driving shaft 16 so as to rotate therewith.

An actuating lever 22 secured to the operating knob 10 has elongated holes 22a, 22b in which guide pins 23a, 23b secured to the body 1 are slidably fitted, respectively, so that the actuating lever 22 is reciprocally moved in the horizontal direction together with the operating knob 10, thereby permitting the operating knob 10 to be positioned in either of the quick winding position (the rightmost position in FIG. 2), the reproducing position (at the left side of the quick winding position), the stop position (at the left side of the reproducing position) and the quick rewinding position (the leftmost position).

The actuating lever 22 is formed with a bent lug 22c against which an extended portion 17b of the switching lever 17 abuts at the left side edge of the lug 22c so that the switching lever 17 is held in its neutral or inoperable position to be described later against the action of the spring 21 when the operating knob 10 is positioned at the stop position. As shown, in the neutral position of the switching lever 17, the driving shaft 16 is held apart from the frictionally driven wheel 24 integral with the winding reel mounting shaft 4.

The supply or rewinding reel mounting shaft 5 has a driven gear 27 integral therewith which meshes with an idler gear 25 having an idler friction wheel 25′ (FIG. 3) integral therewith. The idler gear 25 together with the idler friction wheel 25′ is rotatably mounted by a shaft 26 on the free end of an idler lever 26b which is in turn swingably supported by a shaft 38 mounting thereon the eraser head 7 described previously. The idler lever 26b is urged in the clockwise direction by a spring 26a and arrested its clockwise direction by a stopper pin 26e so that the idler gear 25 is held in meshing engagement with the driven gear 27 of the rewinding reel mounting shaft 5 while the idler friction wheel 25′ is held apart from the frictional driving wheel 19 at a position opposite to the frictionally driven wheel 24 with respect to the driving shaft 16 when the switching lever 17 is in its neutral position as shown in FIG. 2.

Thus, when the operating knob 10 is switched from the stop position rightwards to the reproducing position, the actuating lever 22 is moved rightwards so that the switching lever 17 is swing in the counterclockwise direction by the action of the spring 21 so that the driving shaft 16 abuts against the frictionally driven wheel 24 of the winding reel mounting shaft 4 by the constant pressing force as given by the spring 21 thereby frictionally driving the winding reel mounting shaft 4 for the reproducing operation.

When the operating knob 10 is further moved to the right from the reproducing position to the quick winding position, the driving shaft 16 is held in compressive engagement with the frictionally driven wheel 24 by the action of the spring 21, while a motor speed control circuit SPC (FIG. 4) for controlling the speed of the motor 13 for the reproducing operation is short-circuited in the manner to be described later so that the motor speed is increased thereby effecting the quick winding operation.

When the operating knob 10 is moved leftwards from the stop position to the quick rewinding position, the actuating lever 22 is moved leftwards and the bent lug 22c of the lever 22 engaging with the extended portion 17b of the switching lever 17 urges the lever 17 in the clockwise direction against the action of the spring 21 so that the frictional driving wheel 19 integral with the driving shaft 16 frictionally engages with the idler friction wheel 25′ (FIG. 3) integral with the idler gear 25 meshing with the driven gear 27 of the rewinding reel mounting shaft 5, wherein the idler lever 26b is urged in the counterclockwise direction against the action of the spring 26a so that the contact force between the frictional driving wheel 19 and the idler friction wheel 25′ is maintained constant by the spring 26a. Thus, the rewinding reel mounting shaft 5 is rotated at a higher speed by virtue of the large diameter of the driving wheel 19 for the quick rewinding operation. This permits the tape recorder to be operated in the reproducing, the quick winding and the quick rewinding operation by the one and the same direction of rotation of the driving motor 13.

In order to clickingly hold the operating knob 10 and, hence, the actuating lever 22 in the stop position and the reproducing position, the actuating lever 22 is formed with a clicking cam portion 28a for the stop position, a clicking cam portion 28b for the reproducing position, and a clicking roller 30 cooperates with these cam portions 28a, 28b. The clicking roller 30 is preferably rotatably mounted on the free end of a clicking lever 29 swingably supported at its other end to the body 1 by the guide pin 23a commonly used in guiding the actuating lever 22. The clicking lever 29 is urged in the counterclockwise direction by a spring 31 wound around the guide pin 23a and having its one end secured to the shaft of the roller 30 and its other end supported by the pin 20 supporting the spring 21. Thus, the clicking roller 30 is snugly engaged with either of the cam portions 28a, 28b depending upon the position of the actuating lever 22 thereby clickingly holding the actuating lever 22 at either of the stop or the reproducing position to which it is selectively moved.

In accordance with the present invention, an inclined cam portion 28c for the quick winding operation is formed at the outer side of the cam portion 28b contiguously thereto while an inclined cam portion 28d for the quick rewinding operation is formed at the outer side of the cam portion 28a contiguously thereto. Thus, when the operator releases his finger from the operating knob 10 after the same has been manually moved to either of the quick winding or the quick rewinding position for the aimed operation of the tape recorder, the actuating lever 22 is automatically moved back to the reproducing or the stop position by virtue of the engagement of the inclined cam 28c or 28d with the clicking roller 30 thereby permitting the quick winding or the quick rewinding operation to be positively and quickly stopped without requiring any additional manual operation of the knob 10. This insures the safe and accurate operation at either of the quick winding and the quick rewinding position of the tape recorder.

Further, in accordance with the present invention, a switch SW1 for energizing or deenergizing the tape recorder by an electric source (not shown), a switch SW2 for selectively connecting the previously described motor speed control circuit SPC to the motor circuit and a switch SW3 for selectively connecting an overcurrent detecting and interrupting circuit OCC to the motor circuit are arranged in the body 1 as shown in FIGS. 2 and 4. The switches SW1, SW2 and SW3 are supported by a support member 33 made of an electrically insulating material and secured to the body 1 and the movable contact of each of the switches SW1, SW2 and SW3 is adapted to cooperate with a switch actuating member 32 secured to the actuating lever 22 so that the switches SW1, SW2 and SW3 are selectively closed or opened independently from each other depending upon the position of the actuating lever 22 as it is switched to either any one of the stop, the reproducing, the quick winding or the quick rewinding position.

As shown in FIG. 4, the switch SW1 is held opened to deenergize the motor 13 and the control circuit of the tape recorder insofar as the operating knob 10 is held at the stop position to save the electric power of the electric source, but, when the operating knob 10 is switched to any one of the reproducing, the quick winding or the quick rewinding position, the switch SW1 is closed to energize the motor 13 and the control circuit of the tape recorder for the operation thereof.

The switch SW2 is so electrically connected to the motor circuit that, when the switch SW2 is held opened, the motor speed control circuit SPC is connected in parallel to the motor 13 so that the speed of the motor 13 is set at a constant speed for the reproducing operation, but, when the switch SW2 is closed, the motor speed control circuit SPC is short-circuited thereby increasing the speed of the motor 13. Accordingly, the switch SW2 is closed by the switch actuating member 32 only when the operating knob 10 is switched to the quick winding position for the quick winding operation.

The switch SW3 is so electrically connected to the motor circuit that, when the switch SW3 is held opened, the overcurrent detecting and interrupting circuit OCC is connected in the motor circuit so as to detect and interrupt the undue overcurrent which flows through the motor 13 for preventing the damage to the motor 13, but, when the switch SW3 is closed, the overcurrent detecting and interrupting circuit OCC is short-circuited so as to allow the overcurrent to flow through the motor 13. Accordingly, the actuation of the switch SW3 is so controlled by the switch actuating member 32 that the switch SW3 is closed only when the operating knob 10 is moved to either the quick winding or the quick rewinding position thereby allowing the overcurrent to flow through the motor 13, while the switch SW3 is held opened insofar as the operating knob 10 is held at either the stop or the reproducing position.

Since the quick winding and the quick rewinding operation is effected for a relatively short period of time under direct control of the operator, the overcurrent which might flow through the motor 13 will not lead to damage to the motor 13 while the quick winding and the quick rewinding operation is positively insured. The overcurrent detecting and interrupting circuit OCC mainly serves to stop the operation of the tape recorder when the tape being fed during the reproducing operation (or the recording operation to be described later) comes to the terminal position or the feeding of the tape during the reproducing or recording operation is blocked for some reasons such as the failure of the mechanical parts of the tape recorder thereby unduly increase the current to be flown through the motor 13.

Although the arrangement of the switches SW1, SW2 and SW3 is shown only schematically in FIG. 2, it is evident that a person skilled in the art can construct these switches SW1, SW2 and SW3 cooperating with the switch actuating member 32 for the purpose described above with reference to FIG. 4.

In order to effect the recording operation, the tape recorder of the present invention is provided with a recording lever 34 attached to the recording knob 11 as shown in FIG. 2. The recording lever 34 has elongated grooves 34a, 34b in which guide pins 35a, 35b secured to the body 1 are slidably engaged so as to reciprocally guide the lever 34 upwards and downwards in FIG. 2 and urged downwardly to the inoperative position by a spring 36 having its one end supported by a bent lug 34c formed in the lever 34 and its other end secured to the guide pin 35a which serves also to limit the downward movement of the lever 34 to the inoperative position thereof.

The obliquely and upwardly extending arm 34d of the recording lever 34 mounts on its tip a pin 37. The pin 37 is slidably fitted in an elongated hole 39a formed in a lever 39 integral with the eraser head 7. The lever 39 is rotatably supported by the shaft 38 which swingably supports the idler lever 26b as previously described, so that the eraser head 7 is swung so as to bring the eraser magnet 40 thereof to its operative position with respect to the tape fed across the eraser hed 7 and the reproducing/recording head 6 when the recording lever 34 is moved to its operative position, while the switching of the recording lever 34 to the operative position switches simultaneously the control circuit of the tape recorder in the manner well known so that the tape recorder is placed in recording operation insofar as the operating knob 10 is set to the reproducing position and the recording knob 11 is held pushed for the recording operation.

In order to releasably arrest the recording lever 34 in its recording position against the action of the spring 36, the lever 34 is formed with a downwardly bent lug 34e which is adapted to releasably engage with an inclined cam surface 41d having a shoulder 41e which is formed in a swingable arresting lever 41 swingably supported on the body 1 by a pin 42 secured to the body 1. The lever 41 is urged in the clockwise direction by a spring 44 having its one end secured to a bent lug 41a of the lever 41 and its other end secured to a pin 43 secured to the body 1 so that, when the recording knob 11 is pushed from its inoperative position to the operative or recording position, the bent lug 34e slides along the inclined cam surface 41d and rides over the shoulder 41e thereby arresting the lever 34 to its recording position by the engagement of the shoulder 41e with the bent lug 34e for continuing the recording operation.

The arresting lever 41 has an upwardly extending portion 41b which cooperates with a bent lug 22e formed in the actuating lever 22 and located at the right side of the portion 41b spaced with a little clearance therefrom when the actuating lever 22 is in the stop position, while the actuating lever 22 is formed with a bent lug 22d cooperating with the arresting lever 34 at a portion thereof beneath the pin 42 and located at the left side thereof spaced a clearance therefrom when the actuating lever 22 is set to the stop position and the reproducing position.

Therefore, when the actuating lever 22 is set to the reproducing position and the recording lever 34 is moved to and arrested at the recording position by the arresting lever 41, the tape recorder is held in the recording position without being affected by the provision of the arresting lever 34.

The clearance between the upwardly extending portion 41b of the arresting lever 41 and the bent lug 22e of the actuating lever 22 at its stop position is so determined that the bent lug 22e urges the portion 41b so as to swing the arresting lever 41 in the counterclockwise direction against the action of the spring 44 when the actuating lever 22 is moved from the stop position to the quick rewinding position thereby releasig the shoulder 41e from the bent lug 34e of the recording lever 34 held in the recording position prior to the closure of the switches SW2 and SW3 and, hence, prior to the actual commencement of the quick rewinding operation so that the recording operation is positively stopped before the quick rewinding operation actually commences.

Similarly, the clearance between the arresting lever 41 and the bent lug 22d of the actuating lever 22 when it is set to the reproducing position is so determined that the arresting lever 41 is urged by the bent lug 22d so as to be swung in the counterclockwise direction when the actuating lever 22 is switched from the reproducing position to the quick winding position thereby releasing the recording lever 34 arrested in the recording position from the arresting lever 41 for inactivating the recording operation prior to the closure of the switches SW2 and SW3 and, hence, the commencement of the quick winding operation.

This positively prevents false function of the tape recorder which might be caused in the prior art tape recorder by the careless operation of the operator.

One of the characteristic features of the present invention lies in the novel arrangement of the quick rewinding mechanism.

Prior to the description of the novel arrangement of the quick rewinding mechanism of the present invention, some of the conventional friction power transmitting systems will be described with reference to FIGS. 5 to 8. In a power transmitting system, it was well known that an intermediate wheel b generally referred to as an idler wheel is moved to contact with both the driving wheel a and the driven wheel c for transmitting the torque from the wheel a to the wheel c by actuating a lever d supporting the idler wheel be in either of the translational movement or the swinging movement as shown in FIGS. 5 and 6. Alternatively, the intermediate wheel b is moved to contact with the driving wheel a while the wheel b is coupled at all times with the other wheel c by swinging the lever d as shown in FIGS. 7 and 8.

In the case of friction wheels, the arrangement as shown in FIGS. 5 and 6 is frequently used.

In the case gears are used, the arrangement as shown in FIG. 7 or 8 is frequently used.

Assuming now that the direction of rotation of the driving wheel a is the clockwise direction, then the direction of the driving wheel a for the power transmission results in the driving-in tendency as is clear from the drawings. Therefore, the positive power transmission to the driven wheel c is insured even though the engaging force between the driving wheel a and the idler wheel b is very small. In this case, however, the load to be applied to the driven wheel c might be instantaneously increased, particularly in the case when the terminal position of the tape is reached in which case the hardness of rubber tires of the friction wheels might vary due to the temperature change to vary the frictional force thereby causing uneven torque thereby deteriorating the operation of the tape recorder or the driven wheel c might be completely blocked by the sticking of the idler wheel b to the driving and the driven wheel thereby resulting in failure or breakage of the friction wheels or the gears or sudden increase in power consumption.

In order to positively avoid the above described difficulties, the frictional power transmitting device employed in the present invention as the quick rewinding mechanism is so constructed as shown in FIG. 2 that the position of the idler friction wheel 25' to be engaged with the frictionally driving wheel 19 and the idler gear 25 to be meshed with the driven gear 27 are in fact selected so as to result in the driving-in tendency as described above so that positive power transmission is insured even though the engaging force is small, and, further, the center of rotation of the idler friction wheel 25' is positioned adjacent to a line connecting the center of the shaft 38 about which the idler lever 26b is swung and the center of the rewinding reel supporting shaft 5 at the side near the frictionally driving wheel 19 with a small angle $\theta$ being formed between a line connecting the axes of the shaft 26 and the shaft 38 and the above described line connecting the axes of the shaft 5 and the shaft 38 when the idler lever 26b is held arrested by the stopper pin 26e, the shaft 26 being located intermediate the shafts 5 and 38 as shown in FIG. 2.

By virtue of the above described arrangement of the wheels and gears, the unduly large load which might be generated upon engagement of the friction wheels 19, 25' with each other is possitively avoided, while positive engagement of the driven gear 27 with the idler gear 25 is insured at all times because of the relative positioning of the lever 26b with respect to the shaft 5.

The above described arrangement also positively avoids undue increase of the electric power consumed and undue large variation in the torque applied to the rewinding reel supporting shaft 5 even though the frictional surface condition of the friction wheels varies due to the changes in temperature and humidity, etc.

The results of the tests made in the tape recorder of the present invention showed excellent performance of the tape recorder of the present invention under conditions ranging between very high and very low temperature.

I claim:

1. In a cassette tape recorder capable of manually switching the operation thereof to any one of a stop position, a reproducing position, a quick winding position and a quick rewinding position and having a manually operable actuating lever for switching the position of operation of the tape recorder, a swingable switching lever coupled with said actuating lever, a driving shaft mounted on said actuating lever and driving wheel means integral with said driving shaft and driven by a driving motor adapted to rotate in a predetermined direction, a winding reel mounting shaft having a frictionally driven wheel integral therewith and a supply or rewinding reel mounting shaft having a driven gear integral therewith which is coupled with an idler wheel means, said idler wheel means being located at a position opposite to said frictionally driven wheel with respect to said driving shaft integral with said driving wheel means, said driving shaft and said driving wheel means being held disengaged from said frictionally driven wheel or said idler wheel means at the stop position of said actuating lever, but, when said actuating lever is switched to the reproducing position, said switching lever is swung in one direction so as to compressively contact said driving shaft with said frictionally driven wheel thereby driving said winding reel mounting shaft at a predetermined speed for the reproducing operation, while, when said actuating lever is switched to the quick rewinding position, said switching lever is swung in the opposite direction so as to compressively contact said driving wheel means with said idler wheel means thereby driving said rewinding reel mounting shaft at a higher speed through said driven gear for the quick rewinding operation, the improvement wherein said driving wheel means integral with said driving shaft comprises:

a frictional driving wheel integrally mounted on said driving shaft and said idler wheel means comprising an idler friction wheel and an idler gear integral with said idler friction wheel;

said idler friction wheel being adapted to engage with said frictional driving wheel at the rewinding position of said actuating lever and said idler gear meshing with said driven gear of said rewinding reel mounting shaft thereby permitting said rewinding reel mounting shaft to be frictionally driven through said idler friction wheel for the quick rewinding operation, and means ensuring positive power transmission between said frictionally driven wheel and said idler friction wheel being ensured even with small engaging forces, including:

a swingable switching lever shaft for swingably supporting said swingable switching lever, such that a first line passing through the cengers of said swingable lever shaft and said rewinding reel supporting shaft, and an idle gear shaft carried by said swingable lever, such that a second line passing through the centers of said swingable lever shaft and said idle gear shaft are displaced from each other by a small angle $\theta$, so that the positive power transmission is ensured and results in a driving-in tendency even though the aforesaid engaging forces are small.

2. The tape recorder according to claim 1, wherein said idler gear and said idler friction wheel are rotatably mounted as a unit on the free end of said swingable lever, a spring urging said swingable lever in a direction to move said idler friction wheel toward said frictional driving wheel, a stopper at the stop position of said actuating lever for holding said idler friction wheel apart from said frictional driving wheel while said idler gear is held in engagement with said driven gear of said rewinding reel mounting shaft.

3. The recorder according to claim 2, wherein the axis of said idler gear is positioned on said second line and substantially on said first line passing through the axis of said rewinding reel mounting shaft and the axis of the pivot point of said idler lever and said spring urges the axis of said idler gear so that said second line moves towards said first line to decrease the angle $\theta$, thereby permitting said frictional driving wheel to be urged into contact with said idler friction wheel by a predetermined resilient force as given by said spring at the quick rewinding position of said actuating lever.

4. The tape recorder according to claim 2 or 3, wherein the pivot point of said idler lever is located opposite to the axis of said rewinding reel mounting shaft with respect to the axis of said idler gear.

5. The tape recorder according to claim 1, wherein said idler gear shaft is positioned between said swingable switching lever shaft and said rewinding reel mounting shaft.

6. The tape recorder according to claim 1, wherein said idler gear shaft is located intermediate said swingable switching lever shaft and said rewinding reel mounting shaft.

7. The tape recorder according to claim 1 or 6, including a spring associated with said idler lever and a stopper pin for maintaining said driven gear and said idler gear in meshing relationship at all times.

8. The tape recorder according to claim 1, including spring means operatively associated with said swingable idler lever to maintain the force between said frictional driving wheel and said idler wheel constant.

* * * * *